United States Patent [19]
Allias

[11] 3,959,587
[45] May 25, 1976

[54] DEVICE FOR SYNCHRONIZING A RECEIVER OF NUMERICAL DATA

[75] Inventor: Bernard Allias, Bretigny-sur-Orge, France

[73] Assignee: Compagnie Industrielle des Telecommunications Cit-Alcatel, Paris, France

[22] Filed: July 6, 1973

[21] Appl. No.: 377,022

[30] Foreign Application Priority Data
July 7, 1972 France .............................. 72.24753

[52] U.S. Cl. ........................ 178/69.5 R; 235/153 R; 325/325; 340/146.1 D
[51] Int. Cl.² ........................ H04L 7/00; G06F 11/00
[58] Field of Search ......................... 178/69.5 R, 53; 340/146.1 D; 325/325; 328/72, 179; 307/269; 235/153 R, 92 SH; 179/15 BS

[56] References Cited
UNITED STATES PATENTS

| | | |
|---|---|---|
| 3,147,342 | 9/1964 | Chojnowski et al. ......... 340/146.1 D |
| 3,576,947 | 5/1971 | Kruger ........................... 178/69.5 R |
| 3,581,010 | 5/1971 | Kobayashi ...................... 178/69.5 R |
| 3,651,263 | 3/1972 | Lindback et al. ............... 178/69.5 R |
| 3,701,096 | 10/1972 | Hunter et al. ................. 340/146.1 D |
| 3,733,585 | 5/1973 | Merlo ............................. 178/69.5 R |
| 3,755,748 | 8/1973 | Carlow et al. .................. 178/69.5 R |
| 3,761,891 | 9/1973 | Markwitz ..................... 340/146.1 D |

*Primary Examiner*—Malcolm A. Morrison
*Assistant Examiner*—Errol A. Krass
*Attorney, Agent, or Firm*—Craig & Antonelli

[57] ABSTRACT

Device for synchronizing a receiver of digital data which serves to identify the beginning of the coding word, for example a level received, hence attributing to each pulse a correct weight in a manner such as to confer on each sample received an amplitude corresponding exactly to the amplitude of the sample taken at the emission, or more generally, for attributing to each pulse a content of data corresponding to the coding at the emission, for example the primary color in a trichromatic color transmission.

17 Claims, 5 Drawing Figures

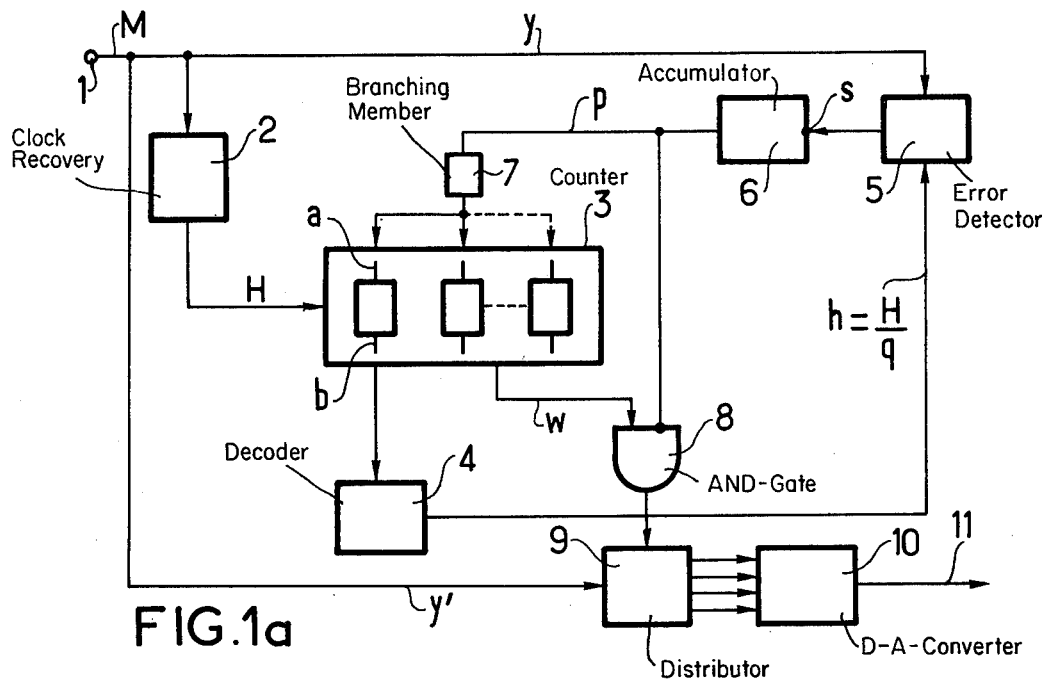

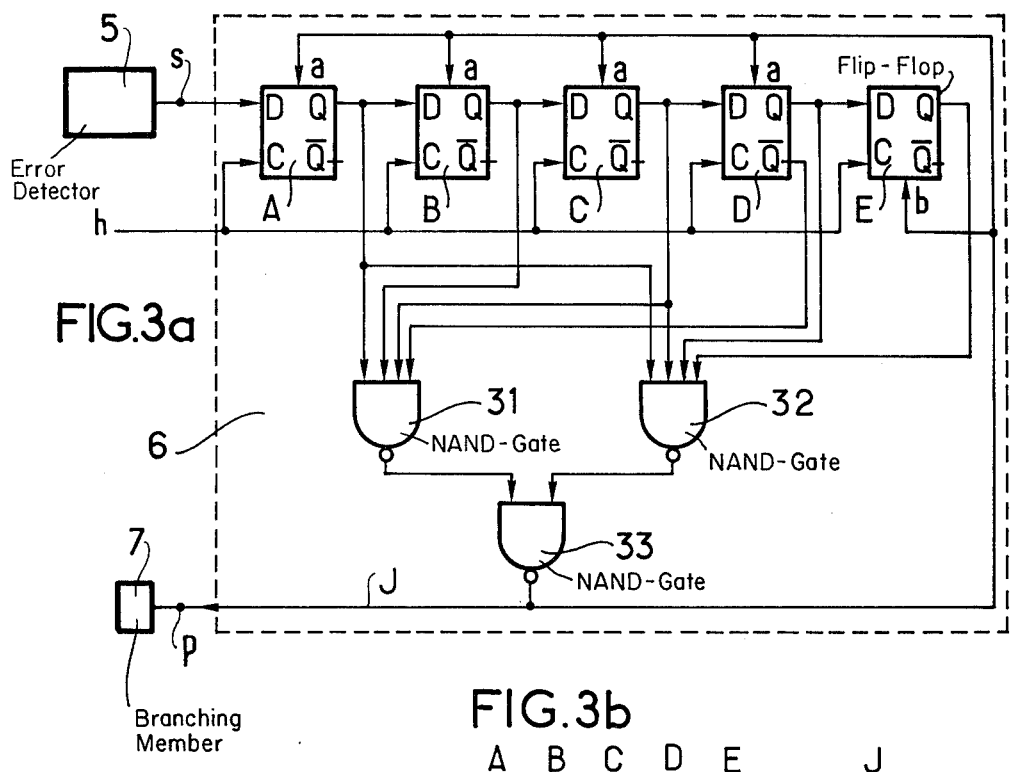

DEVICE FOR SYNCHRONIZING A RECEIVER OF NUMERICAL DATA

The present invention pertains to the field of the reception of data coded by a group of successive pulses each of which provides specific information by virtue of its order or sequence in the group.

It relates to a device which makes it possible to identify the beginning of the coding word, for example a level received, hence for attributing to each pulse a correct weight in such a manner as to confer on each sample being received an amplitude corresponding exactly to the amplitude of the sample taken from the transmission, or more generally, for attributing to each pulse a data content corresponding to the coding of the transmission, for example the primary color in a trichromatic color transmission. The present invention is applied to the synchronization of the messages received in digital transmission, for example an MIC frame or quantization of a group signal in a frequency multiplex. It may be equally applied to the ciphering of messages or to the composition of error detector codes.

In the reception of messages coded by n bits, in other words at $(2^n - 1)$ different quantized levels from zero, in view of the essential uncertain character of any information or data being transmitted, the distribution of the bits is uncertain. In order to find the beginning of each word coding level in the message being received, there is added to the indefinite data coding word a fixed synchronizing word whose position assures proper synchronization of the data. Generally, this synchronizing word comprises several bits, either continuous, or dispersed in the message. The longer this synchronizing word is, the faster it is identified in the message received.

For messages being transmitted comprising q bits, the information is cut up into segments of equal length of $q$ clock times by means of a counter having the capacity $q$. If the counter is synchronized with the transmission, the bits of the synchronizing word are formed in the positions known beforehand. In the opposite case, the bits of the synchronizing word are not found in the predetermined positions. An error detector constituted in an appropriate fashion to locate the synchronizing word will furnish in this case a signal that is used to re-establish synchronism.

For this purpose it is known to alter the counting frequency of the counter, either by inserting or interposing one or several supplementary pulses between two clock times, or by suppressing one or several clock times, or further by interposing a delay line in the system.

The method of abruptly changing the frequency at the input of the counter may lead to disturbances in the operation of the counter during operation at high speed (several mega bits/s). The method of inserting a delay line in the system lacks in flexibility; it introduces an analog element into a numerical process, which is not desirable, and even more so as a result of the variations in the signal which sometimes exceed the noise level by only a small amount. The clock which is provided to synchronize the received signal also may be affected by characteristics which do not match with a delay line of rigid constitution.

The procedure according to the present invention is different. If the error detector finds an error, in other words, if for a predetermined value posted by the counter twice in a row, there is no coincidence between two successive words extracted from two successive messages which should be identical, there is imposed upon the counter by means of a control circuit the posting of a predetermined value. This operation is very rapid, lasts less than one clock-time, and does not alter the counting sequence. It is repeated until synchronism is reached. At that moment the error detector emits no further signal. The posted value being imposed is chosen in such a manner as to obtain synchronism as rapidly as possible.

For one message word of given length, the length of the synchronizing word encroaches upon the information or data word. If the synchronizing word is longer, its detection is more rapid and more certain, but the information or data wrd is cut off by the same extent.

In order to preserve the greatest possible sharpness for the quantization of the level transmitted, the synchronizing word will preferably be limited to a single bit. If, in a particular case, the structure of the message is such that one single bit is found to be in quasi-permanence with a very high probability, for example greater than 80 percent, this bit may be taken as a synchronizing reference or indication.

According to a preferred embodiment of the present invention, it is possible to incorporate one indication bit in the message comprising a total of $q$ bits, of the order $k$ which will alternately be 1, 0, 1, 0, etc. With n level bits, one sign bit, and one synchronizing bit, there will be produced $q = n + 2$ bits. For example, for $n = 9$, the message of 11 bits will furnish the codes from 0 to $+511$ and from 0 to $-511$.

The synchronizing bit having a predetermined order or sequence $k$ in the message has its position indicated or marked by a "time window" furnished by a counter having the capacity q whose condition k is detected by a decoder. If the alternation 1, 0, 1, 0, etc. is not observed, which is noted by comparing the content of the time window for two conditions $k$ of the counter spaced by $q$ clock times, the counter is reset in response to the command of the error detector.

In order to begin a new comparison cycle again as soon as possible, it is advantageous to reset the counter to the condition $(k-1)$. In this manner a time window $k$ will appear at the clock time which immediately follows the resetting, beginning a new comparison process.

In order to avoid the starting of a procedure for resetting the counter in the case of a parasitic disturbance, it is necessary to adopt a rule of prudence; for example, by means of a device for indicating errors one initiates a resetting for three successive errors (three 1s at the output of the error detector), and synchronism is considered to be reestablished for at least two zeros in a row. The resetting is not initiated for a single error, nor for two successive errors, but only for three successive errors. If after three "ones" a zero appears, the resetting is suspended; if this zero is followed by a "one," the resetting resumes immediately; if this zero is followed by at least a second zero, the operation is terminated. For purposes of resuming operation, it is necessary that three "ones" in a row be produced again. Within the framework of the present invention, another analogous rule would be possible.

Described hereinafter is an apparatus according to the present invention, using one synchronizing bit with a regularly alternated valency, with reference to the accompanying drawings, wherein FIG. 1a is a schematic block diagram of one embodiment of the present invention;

FIG. 1b is a detail of the diagram according to FIG. 1a corresponding to a modified embodiment of the invention;

FIG. 2 is a schematic diagram of an error detector;

FIG. 3a is a schematic diagram of a member for indicating the errors, and

FIG. 3b is a table representing the progression of the information in a member according to FIG. 3a.

The message M comprising q coded pulses arrives at 1. It is received in a clock recovery member 2 of a type known in the art, for example a resonant circuit excited by pulses. The reconstituted clock signal H is applied to a counter 3 having the capacity $q$. This counter 3 is symbolically represented in the form of several bistable flip-flops, three of which have been shown schematically, each having a set terminal $a$ for setting the flip-flop to 1 and a reset terminal $b$ for resetting the flip-flop to zero.

The counter 3 is connected to a decoder 4, which gives an output pulse for a condition $k$ of the counter 3. The condition $K$ indicates the order of one synchronizing bit in the message M. In the operating condition, the output frequency of the pulses of the decoder 4 is $h = H/q$.

Reference numeral 5 indicates an error detector which receives at one input the message M by way of a line y and the clock signal $h$ at the other input. If there are errors in the regular switching between ones and zeros for each condition $k$ of the counter 3, this is an indication that the condition $k$ of the counter 3 does not correspond to the order of the synchronizing bit in the message M. Under this condition, the error detector 5 sends a 1 to a member 6 which enters the errors. The construction and function of member 6 will be further explained hereinbelow.

The output of the member 6, designated with reference symbol $p$, is applied either to a terminal $a$ or to a terminal $b$ of each of the flip-flops constituting the counter 3 by means of a purely passive interconnecting member 7, which has as many outputs as there are flip-flops in the counter 3, these outputs being connected either to a terminal $a$ or to a terminal $b$ in such a manner that, if a signal 1 is present on the line p, the counter 3 will be set to the condition ($k-1$).

The output of p of the member 6 is connected on the other hand to an inhibiting input of an AND gate 8 whose other input is connected to the outputs of the counter 3, symbolically shown by a line w, on which appear in succession pulses corresponding to the conditions 1, 2 . . . q of the counter 3.

A distributor 9, of a known type, which receives the message M by way of a line y' also receives an advance signal from the output of the gate 8. It controls a weighting means 10, which is also known in the art, as a function of the order or sequence of each bit (1, 2 . . . q) in the message. The reconstituted message is obtained at 11 at the output of the weighting means 10.

If the member 6 indicates an error to be corrected, it effects by means of its output p the condition ($k-1$) in the counter 3 by means of the interconnecting member 7. At the same time the advance of the distributor is stopped by the signal $p$ at the inhibiting input of the AND gate 8.

According to a simplified embodiment of the present invention, the error indicating member 6 could be omitted and the interconnecting member 7 would then be directly connected to the output of the error detector 5.

FIG. 1b is a detail of the diagram of FIG. 1a corresponding to the case where, for example in an MIC frame of n channels, the nature of the message changes from one channel to the other, with an order or sequence k of the synchronizing bit being adapted to vary from one channel to the other. In this case, the resetting "word" ($K-1$) varies also from one channel to the other.

By virtue of the simplicity of the means use by the present invention, it is easy, in such a case, to replace the single interconnecting member 7 of FIG. 1a with a group of members $7_1$, $7_2$ . . . $7_n$ all connected to the output p of the member 6 (FIG. 1a), but only a single one of which is used in resetting the counter 3 by a step-by-step member 12, which is controlled for example by a frame demultiplexer 13.

FIG. 2 is the diagram of an error detector as provided in FIG. 1. It comprises a first bistable flip-flop 21 of the type D and a second bistable flip-flop 22 of the same type, as well as an assembly 23 comprising three AND gates 25, 25 and 26, which performs an EXCLUSIVE OR function.

The message M arrives on the teminal D of the flip-flop 21. The terminal Q of the flip-flop 21 is connected to the terminal D of the flip-flop 22. The terminals C of the two flip-flops 21 and 22 receive the clock signals h from decoder 4. The AND gate 24 has its inputs connected to the Q outputs of the flip-flops 21 and 22. The AND gate 25 has its inputs connected to the $\overline{Q}$ outputs of these flip-flops. The reference letter s represents the output of the third AND gate 26.

It is known that a flip-flop of the D type reproduces on the terminal Q information existing on its input D upon receipt of the rising front of a clock pulse applied to input C. If in two successive times h there arrive at input D of flip-flop 21 signals of the same valency, which constitutes an error, there appears a 1 at terminal s.

FIG. 3a is the logic diagram of a logic indicating member 6. The rule of prudence applied is that which has been described hereinabove and which will be recalled in the table given below. In this talbe which comprises seven lines and four columns of 0 and 1, the column marked P indicates the valency of the last error signal at the output of the error detector 5. The three columns on the left indicate the valency of the signal P at three previous clock times. The supplementary column is marked by an R, indicating that a resetting operation is effected for the configuration of the corresponding line. It is seen at the fourth line that, when the first 0 appears after several ones, the resetting is interrupted but at the fifth line it resumes when a 1 appears after a single 0. Conversely, in the seventh line a 1 appearing after two zeros does not start the resetting operation.

```
      P
    0100
    0110
    0111    R
    1110
    1101    R
    1101
    1001
```

The apparatus of FIG. 3a comprises five flip-flops of the D type, designated A, B, C, D and E connected as a shift register, the output Q of a flip-flop of the order or sequence $j$ being connected to the input D of the flip-flop having the order or sequence $j + 1$, save the last, of course. The terminal D of the last flip-flop receives the output signal s of the error detector 5 (FIG. 1). The terminals C of the five flip-flops receive the clock signals h.

An AND circuit 31 has four inputs connected to the terminals Q of the flip-flops A, B, C and the terminal $\overline{Q}$ of the flip-flop D. An AND circuit 32 has four inputs connected to the outputs Q of the flip-flops A, C, D and E.

A third AND circit 33 receives the outputs of the circuits 31 and 32 and furnishes at the output a signal J which is applied on the one hand to the terminals $a$ for resetting to 1 of the flip-flops A, B, C, D and to a terminal $b$ for resetting the fli-flop E to zero, and on the the other hand to the member 7 (FIG. 1).

This signal J is equivalent to the logical function $$A.B.C.\overline{D} + A.C.D.E.$$

FIG. 3b is a table which represents the progression of the information in the shift register formed by the five flip-flops A to E at six successive times $t1$ to $t6$ in different hypotheses with the new information arriving at A being 1 or 0, at the same time as the resultant valence of the signal J. The signal $\phi$ signifies that the flip-flop E has either the condition 1 or the condition 0. The conditions being marked as X and Y follow each other respectively.

Among the cases possible, only those have been described which differ from the cases previously known. After the first line, the effect of the signal J on the flip-flops has been indicated. It has not been marked thereafter in order to simplify the table, since it has practically no effect upon the end result.

This member 6 for indicating the errors is only one example among many analogous ones which would be feasible.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What I claim is:

1. A device for the synchronization of a received transmission of successive messages formed by coded pulses of $l$ bits including a synchronization bit $k$ for each message, comprising a counter having a capacity of $q$ bits connected to count the coded pulses of said received transmission, said counter being capable of being preset to a selected count, decoder means connected to the output of said counter for providing a clock signal upon detection of each count $k$ of each successive message, error detector means connected to receive said clock signal and said transmission of coded pulses for generating an error signal upon detection of an error in the value of said synchronization bit, presetting means responsive to the output of said error detector means for presetting said counter to said selected count in the case of detection of an error in the value of said synchronization bit by said error detector means, and output means for transmitting said successive messages of coded pulses in synchronism with said counter.

2. A device according to claim 1, wherein said selected count is $k - 1$.

3. A device according to claim 1, further including accumulator means for storing error signals connected between said error detector means and said presetting means.

4. A device according to claim 1, wherein the synchronizing bit alternates in valency from one message to the following message, said error detector means being provided in the form of maans for detecting identity between successive synchronization bits comprising two flip-flop connected in series and an EXCLUSIVE OR circuit connected to the outputs of said two bistable flip-flops.

5. A device according to claim 1, further including output control means for inhibiting said output means in response to detection of an output from said error detector means.

6. A device according to claim 3, wherein said accumulator means includes logic means for enabling said presetting means upon detecting three successive error signals and for disabling said presetting means upon detection of two successive absences of error signals.

7. A device according to claim 3, wherein said accumulator means comprises a shift register connected to the output of said error detector means, first gate means connected to said shift register to detect three successive error signals stored therein, second gate means connected to said shift register to detect three successive error signals followed by absence of an error signal and a fourth error signal, and third gate means for applying the outputs of said first and second gate means to said presetting means in control thereof.

8. A device according to claim 4, wherein said flip-flops forming part of said error detector means are of the D-type having D and C inputs and Q and $\overline{Q}$ outputs, the D input of one flip-flop receiving said transmission and the C input of both flip-flops receiving said clock signal, the Q output of said one flip-flop being connected to the D input of the other flip-flop, the outputs of both flip-flops being connected to said EXCLUSIVE OR circuit.

9. A devie according to claim 7, wherein said shift register comprises five flip-flops of the D-type having Q and $\overline{Q}$ outputs, said first gate means comprises one AND gate receiving the Q outputs of the first three stages and the $\overline{Q}$ output of the fourth stage and said second gate means comprises a second AND gate receiving the Q outputs of the first and third through fifth stages.

10. A device according to claim 7, further including output control means for inhibiting said output means in response to detection of an output from said third gate means.

11. A device for the synchronization of a received transmission formed by a sequence of binary pulses arranged in message blocks of q bits and containing in a particular location inside each block a predetermined synchronization bit, comprising:
 a counter of a capacity of q bits and having a count input, a set input by which the counter is set to a first predetermined count and output terminals,
 a clock pulse generator producing clock pulses in synchronism with the received transmission and feeding these clock pulses to the count input of the counter, decoder means connected to the output terminals of said counter for providing a signal upon detection of a second predetermined count which differs from said first predetermined count, output means for distributing said received transmission into successive block in synchronism with said counter, error detector means receiving said received transmission in response to the output of said decoder for enabling the set input of said counter upon detection of lack of correspondance of the received bit to said predetermined synchronization bit, and means for inhibiting said output means in response to the output of said error detector upon detection of said lack of correspondance.

12. A device according to claim 11, further including accumulator means for storing error conditions connected between said error detector means and said counter.

13. A device according to claim 11, wherein the synchronizing bit alternates in valency from one message to the following message, said error detector means being provided in the form of means for detecting identity between successive synchronization bits comprising two flip-flops connected in series and an EXCLUSIVE OR circuit connected to the outputs of said two bistable flip-flops.

14. A device according to claim 11, in which the counter is provided with at least two set inputs by which the counter is set to different predetermined counts and in which the activation of one particular set input is selected by a commutator controlled according to the sequence of a channel to be decoded within a multiplex frame.

15. A device according to claim 1, wherein said accumulator means includes logic means for enabling said presetting means upon detecting three successive error signals, and for disabling said presetting means upon detection of two successive absences of error signals.

16. A device according to claim 12, wherein said accumulator means comprises a shift register connected to the output of said error detector means, first gate means connected to said shift register to detect three successive error signals stored therein, second gate means connected to said shift register to detect three successive error signals followed by absence of an error signal and a fourth error signal, and third gate means for applying the outputs of said first and second gate means to said set input of said counter.

17. A device according to claim 16, wherein said shift register comprises five flip-flops of the D-type having Q and $\overline{Q}$ outputs, said first gate means comprises one AND gate receiving the Q outputs of the frist three stages and the $\overline{Q}$ output of the fourth stage and said second gate means comprises a second AND gate receiving the Q outputs of the first and third through fifth stages.

* * * * *